US007828501B2

(12) United States Patent
Bauer et al.

(10) Patent No.: US 7,828,501 B2
(45) Date of Patent: Nov. 9, 2010

(54) MOUNTING MECHANISM

(75) Inventors: Alan M. Bauer, Medina, OH (US);
Micah K. Thau, Mountainside, NJ (US)

(73) Assignee: Moen Incorporated, North Olmsted, OH (US)

( * ) Notice: Subject to any disclaimer, the term of this patent is extended or adjusted under 35 U.S.C. 154(b) by 550 days.

(21) Appl. No.: 11/715,583

(22) Filed: Mar. 8, 2007

(65) Prior Publication Data

US 2007/0272812 A1    Nov. 29, 2007

Related U.S. Application Data

(60) Provisional application No. 60/781,299, filed on Mar. 10, 2006.

(51) Int. Cl.
*F16B 21/00* (2006.01)

(52) U.S. Cl. .................. 411/344; 411/258; 411/340; 411/342; 411/345; 411/346; 411/535; 411/908

(58) Field of Classification Search ................ 411/258, 411/340, 342, 344, 345, 346, 535, 908
See application file for complete search history.

(56) References Cited

U.S. PATENT DOCUMENTS

| 979,841 | A | * | 12/1910 | Goewey | ............. 411/345 |
| 2,398,220 | A | | 4/1946 | Gelpcke | |
| 2,998,743 | A | * | 9/1961 | Apfelzweig | ............ 411/342 |
| 3,248,994 | A | | 5/1966 | Mortensen | |
| 3,288,014 | A | | 11/1966 | Mortensen | |
| 3,513,746 | A | * | 5/1970 | Forsberg | ............. 411/346 |
| 3,872,768 | A | * | 3/1975 | Ernst et al. | ............ 411/345 |
| 3,946,636 | A | | 3/1976 | Grey | |
| 4,043,245 | A | * | 8/1977 | Kaplan | ............. 411/346 |
| 4,075,924 | A | | 2/1978 | McSherry et al. | |
| 4,079,655 | A | | 3/1978 | Roberson, Jr. | |
| 4,286,497 | A | * | 9/1981 | Shamah | ............. 411/342 |
| 4,294,156 | A | | 10/1981 | McSherry et al. | |
| 4,439,079 | A | | 3/1984 | Losada | |
| 4,650,386 | A | | 3/1987 | McSherry et al. | |
| 4,810,146 | A | | 3/1989 | Sinclair | |
| 4,865,501 | A | * | 9/1989 | Ferris | ............. 411/340 |

(Continued)

*Primary Examiner*—Victor Batson
*Assistant Examiner*—Roberta Delisle
(74) *Attorney, Agent, or Firm*—Calfee, Halter & Griswold LLP

(57) ABSTRACT

A mounting mechanism is provided for securing an article to a wall. The mounting mechanism can include an insertion member, a base member, and a tab member. The insertion member has at least one hub formed thereon. The base member has a flange and at least one arm depending from the flange. The flange defines an insertion hole, and the at least one arm includes a guide. When the insertion member is provided in the insertion hole, the guide receives the at least one hub. The guide directs movement of the insertion member relative to the base member. The insertion member and the base member include a ratchet mechanism for maintaining the position of the insertion member relative to the base member. The ratchet mechanism can include a pawl formed on the at least one hub and at least one indentation provided on the guide. The pawl can interact with the at least one indentation. The tab member can be removably coupled to the insertion member. The tab member can be used to articulate the insertion member from an insertion orientation to an installed orientation.

25 Claims, 8 Drawing Sheets

U.S. PATENT DOCUMENTS

| | | | | |
|---|---|---|---|---|
| 4,878,790 A | * | 11/1989 | McSherry et al. | 411/34 |
| 5,236,293 A | | 8/1993 | McSherry et al. | |
| 5,275,518 A | | 1/1994 | Guenther | |
| 5,702,218 A | * | 12/1997 | Onofrio | 411/552 |
| 5,749,687 A | * | 5/1998 | Kilgore, III | 411/29 |
| 6,161,999 A | * | 12/2000 | Kaye et al. | 411/344 |
| 6,318,941 B1 | | 11/2001 | Guenther | |
| 6,821,069 B2 | | 11/2004 | Ikuta | |
| 6,884,012 B2 | * | 4/2005 | Panasik | 411/342 |
| 6,893,199 B2 | | 5/2005 | Michels | |
| 7,427,180 B2 | * | 9/2008 | Ladoucer et al. | 411/181 |

\* cited by examiner

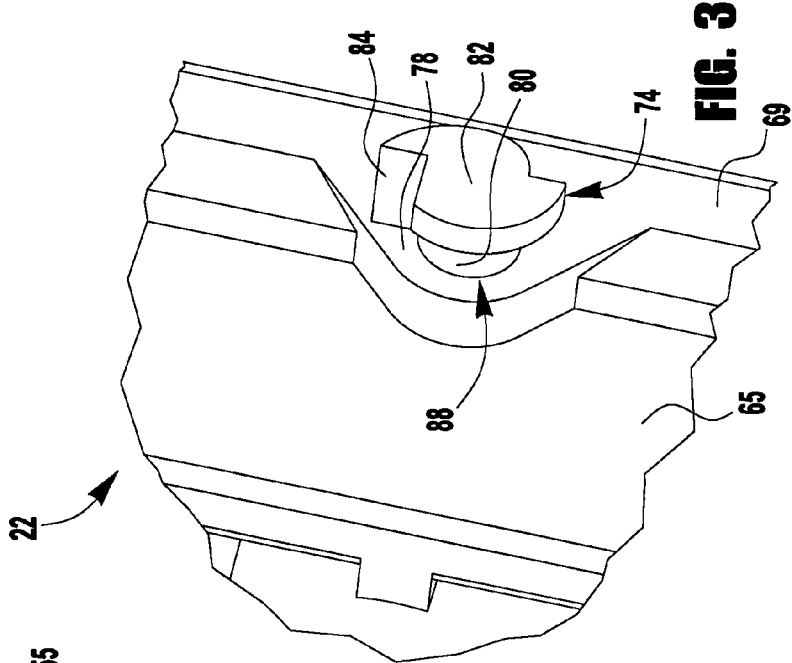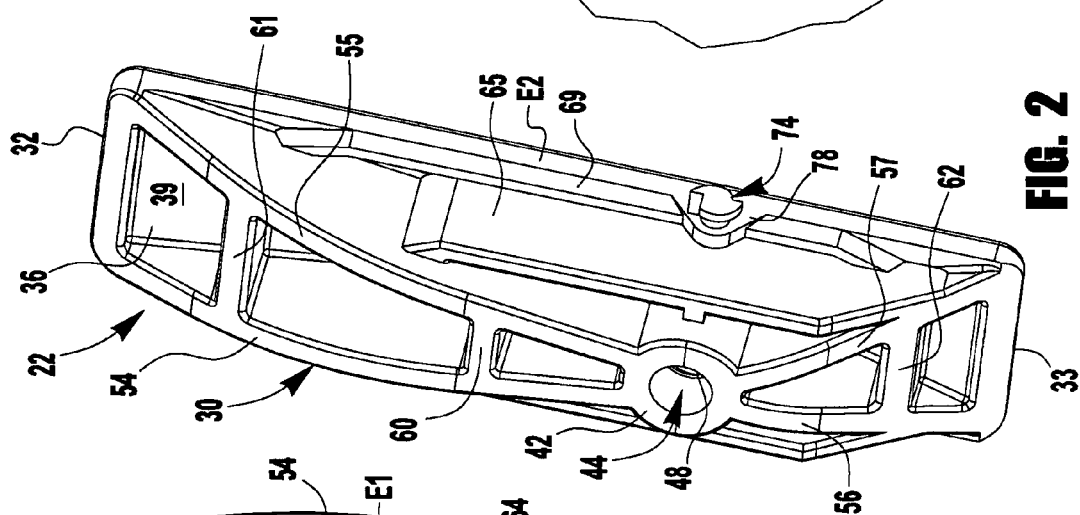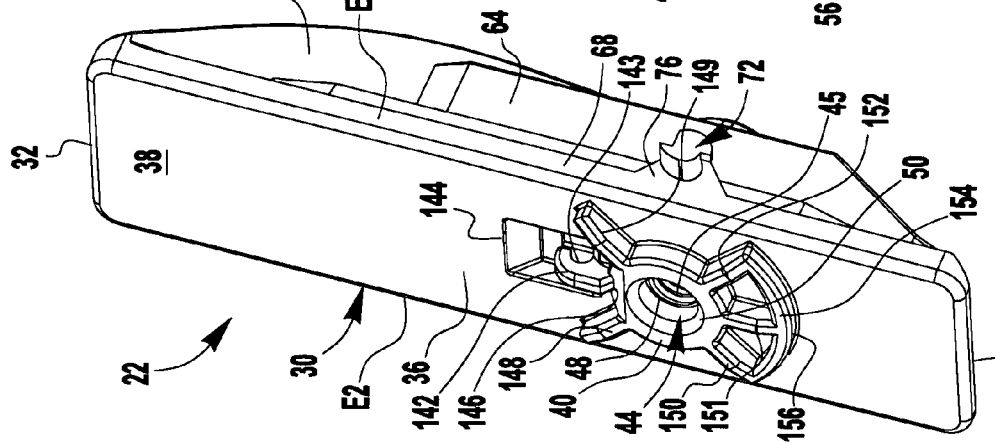

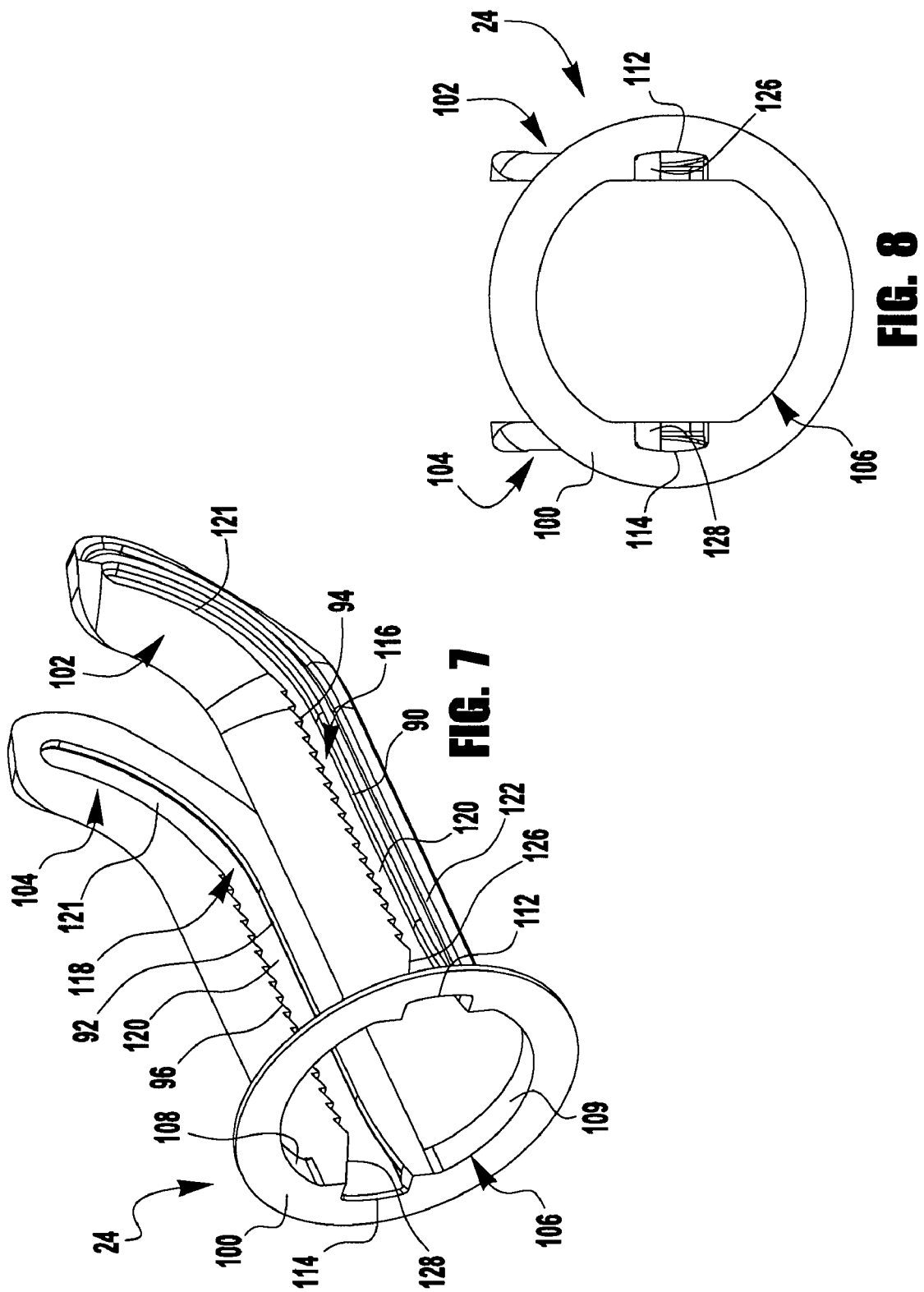

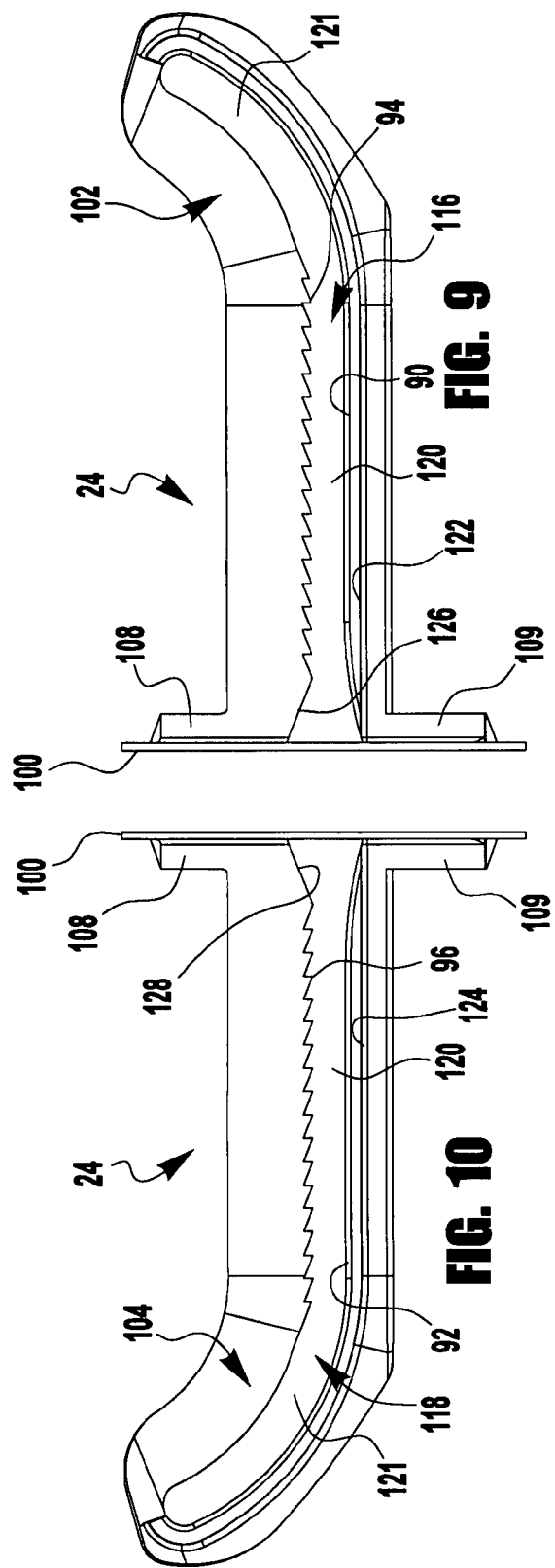
FIG. 9
FIG. 10
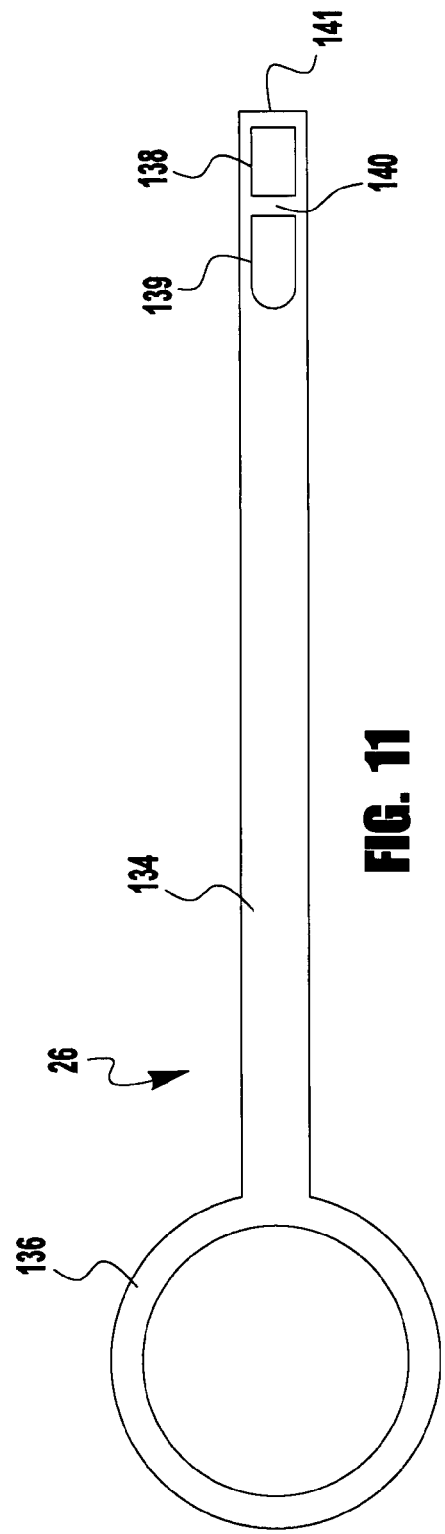
FIG. 11

MOUNTING MECHANISM

RELATED APPLICATION

This application claims the benefit of U.S. provisional Application No. 60/781,299 filed Mar. 10, 2006, the entire disclosure of which is incorporated herein by reference.

TECHNICAL FIELD

The present invention is generally related to a mounting mechanism for securing articles to a wall. More particularly, the present invention is related to a mounting mechanism facilitating attachment of articles to a wall using a base member to position an insertion member within the confines of the wall. More specifically, the present invention is related to a mounting mechanism using an insertion member interacting with a base member to reorient the insertion member from an insertion orientation to an installed orientation.

BACKGROUND

Conventional walls are typically formed using drywall panels attached to vertically-oriented studs. As such, secure attachment of articles to the conventional walls using conventional fasteners, such as screws, has severe limitations. For example, unless the conventional fasteners are inserted through the drywall panels into the studs, the conventional fasteners can cause the drywall panels to disintegrate under heavy load conditions. That is, because of the inherent brittleness of drywall panels, the conventional fasteners attached to the drywall panels have relatively small load bearing capacities. Consequently, there is a need for a mounting mechanism for attaching articles to the drywall panels of conventional walls that provides a large load bearing capacity.

SUMMARY

The present invention contemplates a mounting assembly including an insertion member having at least one hub, and a base member having a flange and at least one arm depending from the flange, where the flange defines an insertion hole, and the at least one arm includes a guide for receiving the at least one hub, the guide having a non-horizontal section.

The present invention also contemplates a mounting assembly including an insertion member having at least one hub, a base member having a flange and at least one arm depending from the flange, where the flange defines an insertion hole, and the at least one arm includes a guide for receiving the at least one hub, and a ratchet mechanism for maintaining the position of the insertion member relative to the base member.

The present invention further contemplates a mounting assembly including an insertion member having at least one hub, a base member having a flange and at least one arm depending from the flange, where the flange defines an insertion hole, and the at least one arm includes a guide for receiving the at least one hub, and a tab member removably coupled to the insertion member, the tab member facilitating articulation of the insertion member from an insertion orientation to an installed orientation.

The present invention still further contemplates a method of orienting an insertion member within the confines of a wall by inserting a base member into an opening provided in a wall, coupling a tab member to an insertion member, inserting the insertion member through an insertion hole defined in the base member, actuating the tab member to articulate the insertion member from an insertion orientation to an installed orientation, and engaging a ratchet mechanism on the insertion member and the base member to maintain the insertion member in the installed orientation.

Further embodiments, variations, and enhancements are also described herein.

BRIEF DESCRIPTION OF THE DRAWINGS

FIG. 1 is a top perspective view of an insertion member forming part of the mounting mechanism of the present invention.

FIG. 2 is a bottom perspective view of the insertion member.

FIG. 3 is an enlarged bottom perspective view of the insertion member depicted in FIG. 2.

FIG. 7 is a top perspective view of a guide sleeve forming part of the mounting mechanism of the present invention.

FIG. 8 is a front elevational view of the guide sleeve.

FIG. 9 is a side elevational view of one side of the guide sleeve.

FIG. 10 is a side elevational view of the other side of the guide sleeve.

FIG. 11 is a top plan view of a tab member used to articulate the insertion member relative to the guide sleeve.

DETAILED DESCRIPTION

Figure 6:
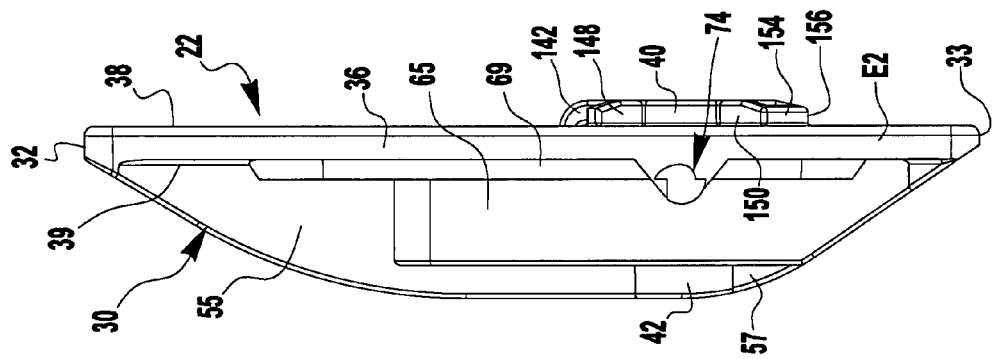
FIG. 6 is a side elevational view of one side of the insertion member.
Figure 5:
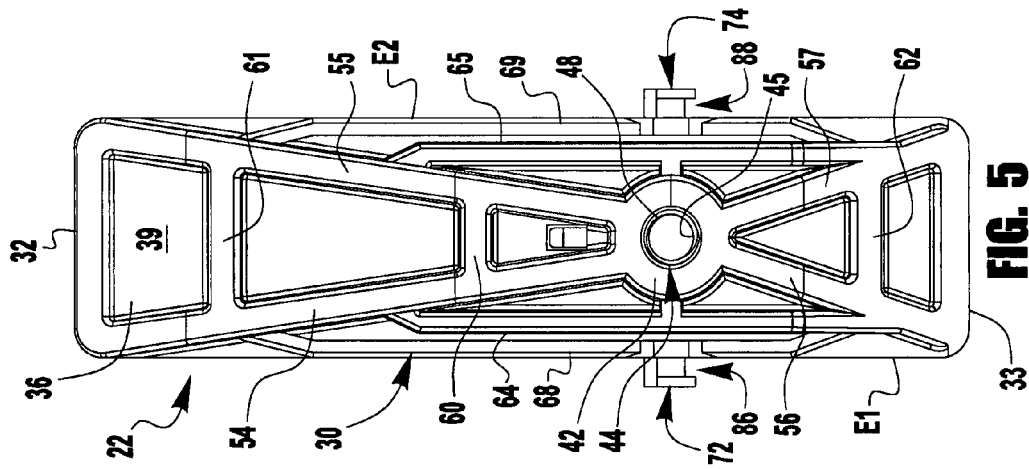
FIG. 5 is a bottom plan view of the insertion member.
Figure 4:
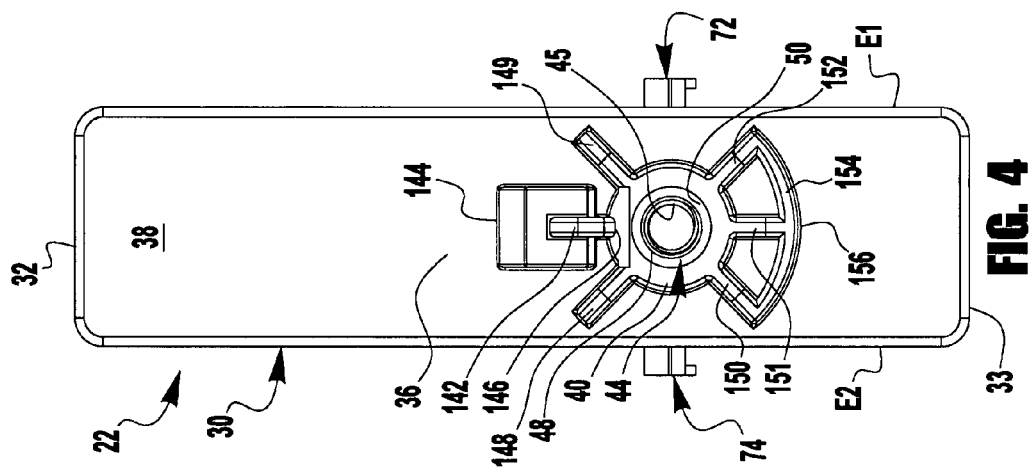
FIG. 4 is a top plan view of the insertion member.
Figure 12:
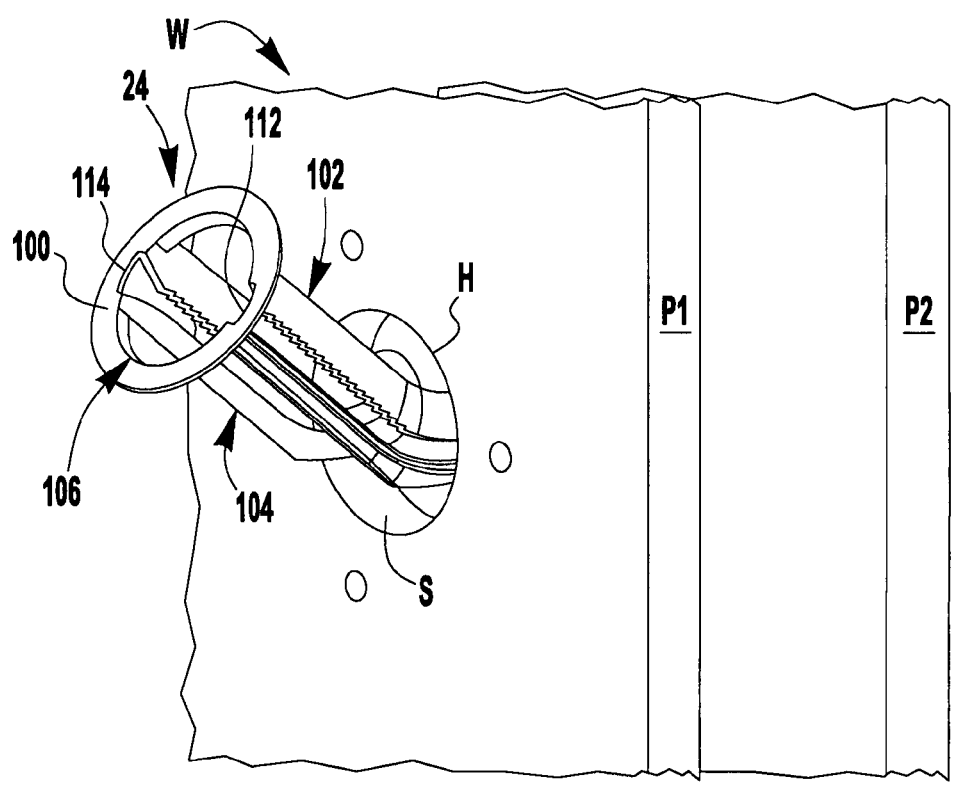
FIG. 12 is a perspective view showing the guide sleeve being inserted into a hole formed in a panel of a wall.
Figure 13:
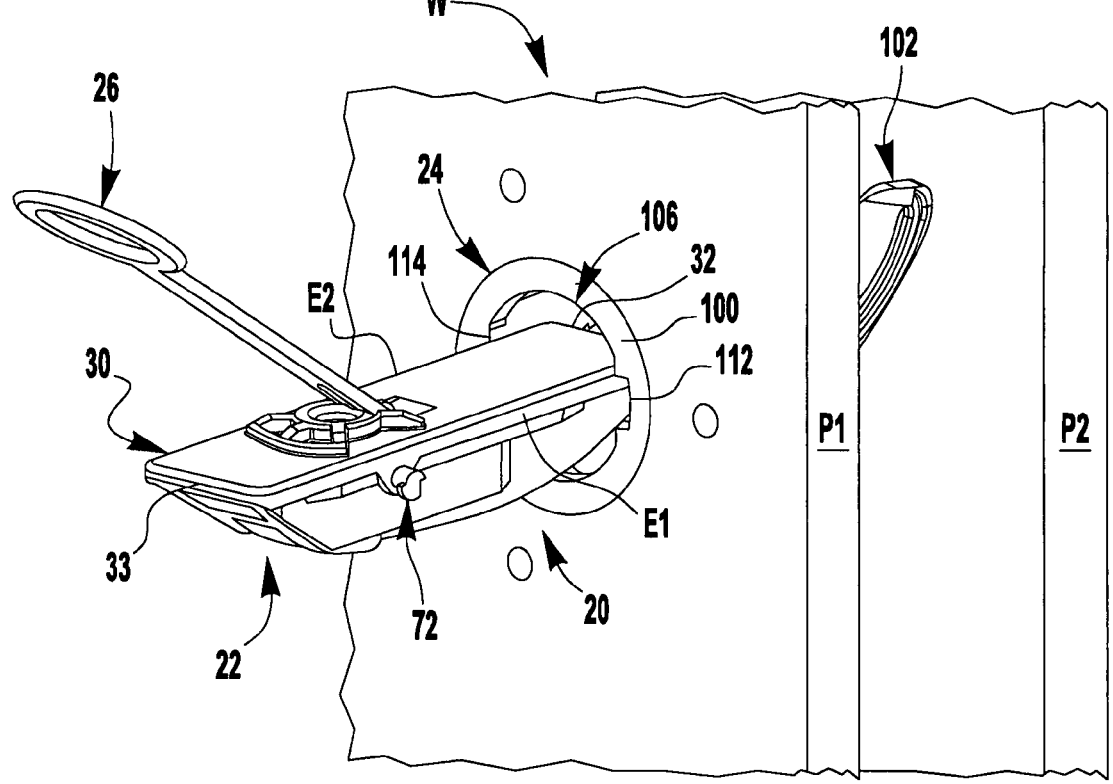
FIG. 13 is a perspective view showing the insertion member being inserted through the guide sleeve into the wall.
Figure 14:
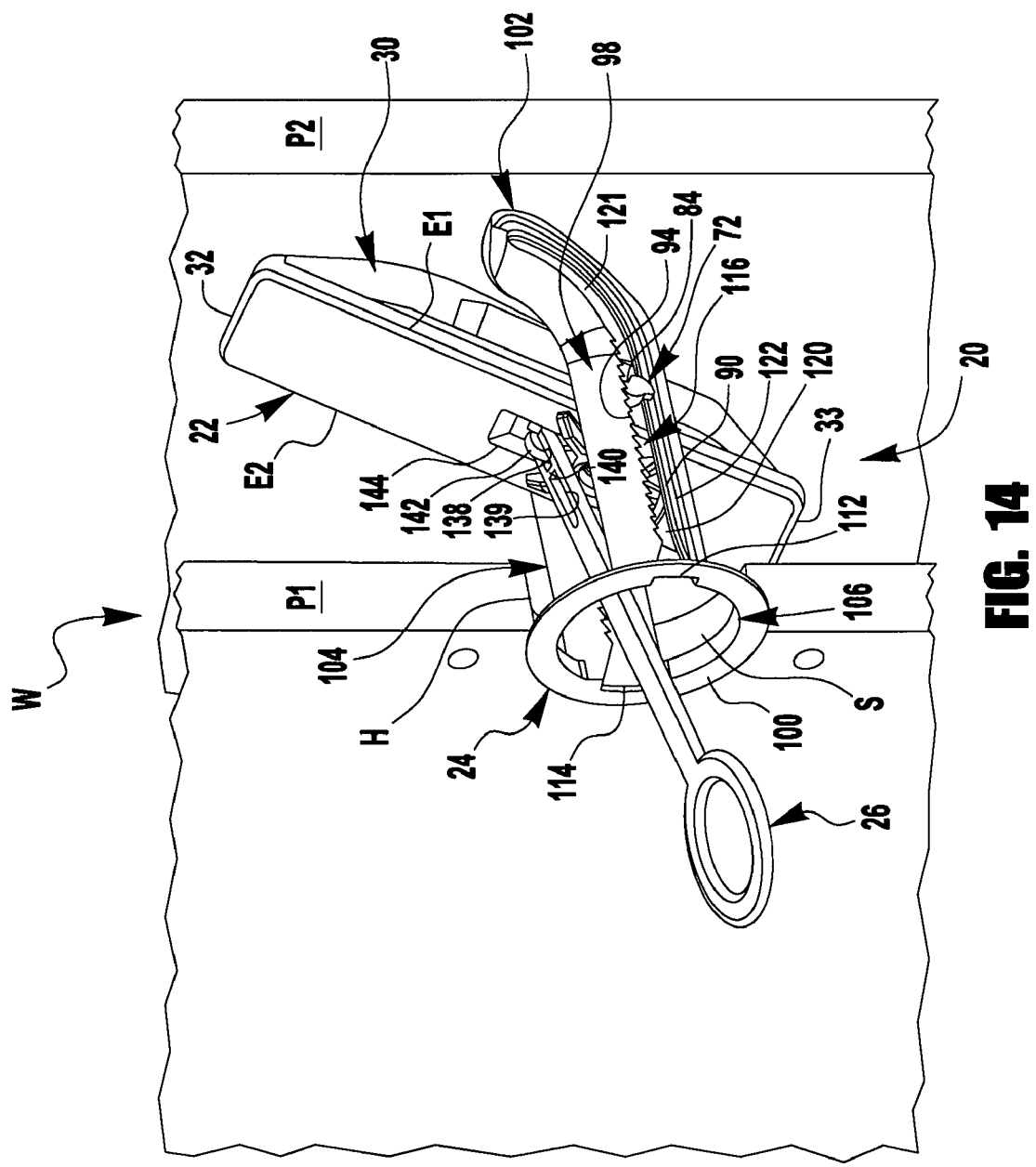
FIG. 14 is a perspective view showing the insertion member being articulated relative to the guide sleeve using the tab member.
Figure 15:
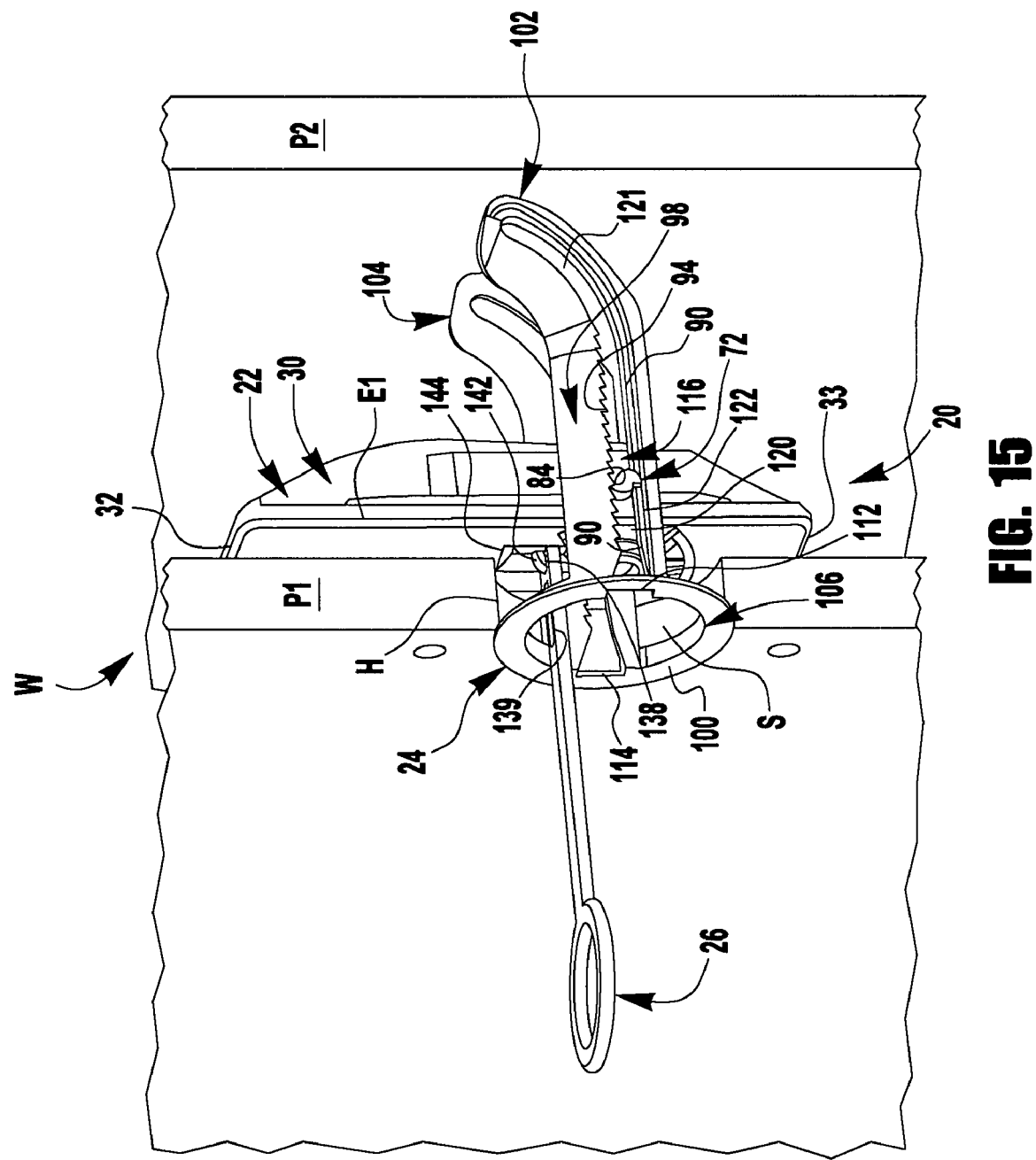
FIG. 15 is a perspective view showing the insertion member positioned adjacent to and parallelly aligned with the panel within the confines of the wall.
Figure 16:
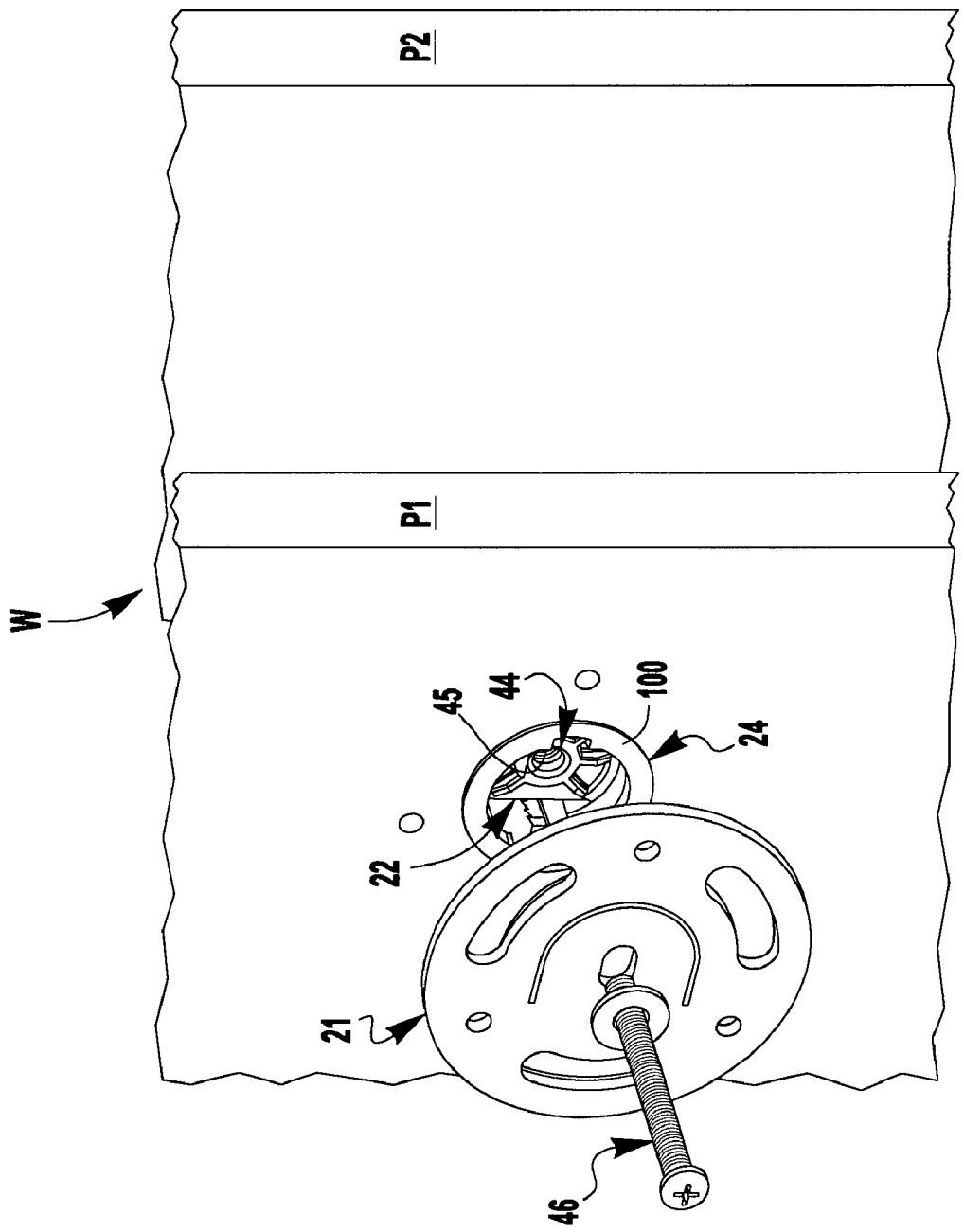
FIG. 16 is a perspective view showing a mounting plate being attached to the insertion member using a mechanical fastener.

The mounting mechanism of the present invention is generally indicated by the numeral 20 in FIGS. 13-15. As depicted in FIGS. 13-15, the mounting mechanism 20 can be configured to attach a mounting plate 21 ( 16) to a conventional wall W formed by panels P1 and P2 attached on either side of studs (not shown). The wall W includes a space of approximately 3.5 inches (i.e. the width of conventional 2×4 studs) between the panels P1 and P2. The mounting mechanism 20 comprises an insertion member generally indicated by the numeral 22 in FIGS. 1-6 and 13-16, and a guide sleeve (or base member) generally indicated by the numeral 24 in FIGS. 7-10 and 12-16. Compared to conventional fasteners, such as screws, use of the mounting mechanism 20 to attach the mounting plate 21 to the wall W can provide increased load bearing capacity. As such, attachment of the mounting plate 21 using the mounting mechanism 20 affords attachment of articles requiring large load bearing capacities to the wall W. For example, an article such as a grab bar (not shown) can be attached to the wall W using the mounting mechanism 20. Such a grab bar can serve as a handhold providing support for users in slippery environments such as bathtubs and showers.

The insertion member 22 and the guide sleeve 24 cooperate with one another to provide an attachment point for the mounting plate 21. That is, using a tab member 26 (FIGS. 11 and 13-15) actuated by a user, the insertion member 22 and the guide sleeve 24 interact to provide an attachment point for the mounting plate 21. As such, the insertion member 22 and the guide sleeve 24 are configured so that the insertion member 22 can be inserted into a circular hole H (FIGS. 12, 14 and 15) having sidewalls S in the panel P1, and reoriented within the limited confines of the wall W between the panels P1 and P2. For example, the insertion member 22 can be moved and articulated relative to the guide sleeve 24 via actuation of the tab member 26 from a horizontal insertion orientation to a vertical installed orientation. In doing so, the insertion member 22 is positioned adjacent to and parallelly aligned with the panel P1 within the confines of the wall W (15). As depicted in 16, the mounting plate 21 can be attached to the wall W by clamping the panel P1 between the mounting plate 21 and the insertion member 22.

As best shown FIGS. 1-6, the insertion member 22 includes a body 30 that can be formed using a variety of molding processes. For example, the body 30 can be formed from polymeric materials such as Acetal (polyoxymethylene (POM)). The body 30 includes a leading end 32 and a trailing end 33, and a base plate 36. The trailing end 32 and the leading end 33 of the body 30 are both rounded and do not have sharp edges. Furthermore, the base plate 36 includes a first side 38 and a second side 39, and edges E1 and E2 extending between the leading end 32 and the trailing end 33 of the body 30. A rim 40 is provided on the first side 38, and a collar 42 is provided on the second side 39. An aperture 44 is provided through the rim 40, collar 42, and base plate 36. As discussed below, the placement of the rim 40 and the collar 42, and, hence, placement of the aperture 44 relative to the leading end 32 and the trailing end 33 increases load bearing capacity of the mounting mechanism 20.

Threads 45 can be provided on the interior of the aperture 44 to receive a threaded fastener 46 (16). The threads 45 can be formed on the interior of a metallic insert 48 provided in the body 30. For example, the body 30 (especially the rim 40, collar 42, and base plate 36) can be formed around the metallic insert 48. As such, if the threaded fastener 46 is metallic, then the metallic insert 48 can be used to facilitate metal-to-metal engagement between the threads 45 and the threaded fastener 46. Additionally, a frusto-conical surface 50 can be provided around the interior of the rim 40 to serve as an entrance to the aperture 44. The surface 50 serves in guiding the threaded fastener 46 into the aperture 44 to engage the threads 45.

The body 30 includes various reinforcing members provided on the second side 39 to strengthen the body 30. For example, ribs 54 and 55 extend outwardly from the collar 42 on the second side 39 toward the leading end 32, and ribs 56 and 57 extend outwardly from the collar 42 on the second side 39 toward the trailing end 33. The ribs 54, 55, 56, and 57, as depicted in 5, form a generally X-shaped pattern on the second side 39. As depicted in 6, the ribs 54, 55, 56, and 57 vary in height from the second side 39 depending on the location relative to the leading end 32 and the trailing end 33. The ribs 54 and 55 decrease in height as they extend outwardly from the collar 42 toward the leading end 32, and the ribs 56 and 57 decrease in height as they extend outwardly from the collar 42 toward the trailing end 33. As discussed below, the varying height of the ribs 54, 55, 56, and 57 forms wedge shapes adjacent the leading end 32 and the trailing end 33 which limit interference when insertion member 22 is reoriented within the confines of the wall W from a horizontal insertion orientation to a vertical installed orientation.

To further strengthen the body 30, extension ribs 60 and 61 extend between the ribs 54 and 55, and an extension rib 62 extends between ribs 56 and 57. The ribs 60, 61, and 62 can be parallelly arranged, and, according to their location relative to the collar 42, the ribs 60 and 61 have heights matched to the ribs 54 and 55 and the rib 62 has a height matched to the ribs 56 and 57. Struts 64 and 65 depending from the second surface 39 are provided between the ribs 54 and 56 and between the ribs 55 and 57, respectively. Furthermore, a strut 68 depends from the second surface 39 between the ribs 54 and 56 along the edge E1, and a strut 69 depends from the second surface 39 between the ribs 55 and 57 along the edge E2. The struts 64 and 65 serve in further strengthening the body 30. During articulation of the insertion member 22 relative to the guide sleeve 24, the struts 68 and 69 (along with the edges E1 and E2) can engage the guide sleeve 24.

Two (2) hubs 72 and 74 extend outwardly from a hub base 76 (provided along struts 64 and 68) and a hub base 78 (provided along struts 65 and 69), respectively. The hubs 72 and 74 each include a post 80, an end cap 82, and a pawl 84. As depicted in 5, gaps 86 and 88 are formed between the hub bases 76 and 78 and the end caps 82 of the hubs 72 and 74, respectively. To facilitate movement and articulation of the insertion member 22 relative to the guide sleeve 24, rails 90 and 92 formed on the guide sleeve 24 (FIGS. 7 and 9-10) can be received in the gaps 86 and 88, respectively, to engage the posts 80. The interaction of the posts 80 with the rails 90 and 92 allows the insertion member 22 to slide on the guide sleeve 24. Furthermore, the end caps 82 and the hub bases 76 and 78 serve to maintain the posts 80 in contact with the rails 90 and 92 during movement and articulation of the insertion member 22 relative to the guide sleeve 24. Moreover, pawls 84 are provided to engage indentations 94 and 96 formed on the guide sleeve 24 to aid in maintaining the insertion member 22 in the installed orientation. As discussed below, the pawls 84 and the indentations 94 and 96 form a ratchet mechanism 98 (15). The ratchet mechanism 98 serves in preventing the insertion member 22 from backing away from a position adjacent the panel P1 Although the ratchet mechanism 98 has been described as including the pawls 84 and the indentations 94 and 96, one of ordinary skill in the art will appreciate that other types of ratchet mechanisms could be used for maintaining the position of the insertion member 22 relative to the guide sleeve 24.

As best shown in FIGS. 7-9, the guide sleeve 24 includes a flange 100 and two (2) arms 102 and 104 depending from the flange 100. The flange 100 can be ring-shaped, and includes an insertion aperture 106 for receiving the insertion member 22 therethrough. The flange 100 also includes a contoured upper rim 108 and a contoured lower rim 109 extending between the arms 102 and 104 adjacent upper and lower portions of the insertion aperture 106, respectively. The exterior surfaces of the arms 102 and 104 can be contoured in a similar fashion to the contoured upper and lower rims 108 and 109. As such, the upper and lower rims 108 and 109, and the exterior surfaces of the arms 102 and 104 can interface with the sidewalls S of the circular hole H to maintain the position of the guide sleeve 24 therein.

Aperture ears 112 and 114 are formed on either side of the insertion aperture 106, and are sized to receive the hubs 72 and 74, respectively. The aperture ears 112 and 114 communicate with channels (or guides) 116 and 118 formed in the arms 102 and 104, respectively. The channels 116 and 118 each include a horizontal section 120 and a non-horizontal section 121, and are defined by upper edges on which the indentations 94 and 96 are formed, and two sets of lower edges. One set of the lower edges forms the rails 90 and 92, and the other set of the lower edges forms ledges 122 and 124. The upper edges of the channels 116 and 118 can include angled portions 126 and 128, respectively. The angled portions 126 and 128 serve to funnel the hubs 72 and 74 into the channels 116 and 118. Although the guides 116 and 118 have been described as channels, one of ordinary skill in the art will appreciate that other structure for guiding or directing the insertion member 22 during articulation of the insertion member 22 could be used.

When the insertion member 22 is inserted into the insertion aperture 106, and the hubs 72 and 74 are inserted through the aperture ears 112 and 114 into the channels 116 and 118, respectively, the rails 90 and 92 are received between the end caps 82 and the hub bases 76 and 78, and the posts 80 engage the rails 90 and 92. During movement and articulation of the insertion member 22 relative to the guide sleeve 24, the posts 80 ride on the rails 90 and 92.

As discussed above, the tab member 26 (11) is provided to facilitate movement and articulation of the insertion member 22 relative to the guide sleeve 24. The tab member 26 includes a stem 134 having a user engagement ring 136 provided at one end, and two (2) holes 138 and 139 separated by a rib 140 provided adjacent a stem tip 141 at the other end. A hook member 142 is provided adjacent the rim 40 on the first side 38 of the base plate 36 to engage the tab member 26. The hook member 142 forms a cavity 143, and extends outwardly from the rim 40 over a recess 144 provided in the first side 38. Furthermore, the rim 40 and the hook member 142 include a notch 146 to facilitate engagement of the rib 140 with the hook member 142.

To removably couple the tab member 26 to the insertion member 22, the stem tip 141 is initially inserted into the recess 144, and the hook member 142 is thereafter received in the hole 138. By inserting the hook member 142 into the hole 138, the stem tip 141 is received within the cavity 143. As such, depending on the angle of the tab member 26 relative to the insertion member 22, the stem tip 141 can engage different sidewalls of the cavity 143, and the rib 140 can engage the hook member 142 at the notch 146. As discussed below, engagement of the tab member 26 with the hook member 142 enables the user to control movement and articulation of the insertion member 22 relative to the guide sleeve 24.

Radial ribs 148, 149, 150, 151, and 152 extend outwardly from the rim 40, and a rib 154 extends between the ribs 150, 151, and 152 on the first side 38. The radial ribs 148 and 149 are sized and shaped such that the ends thereof opposite the rim 40 are provided adjacent the sidewalls S of the circular hole H when the insertion member 22 is positioned adjacent the panel P1. Furthermore, the rib 154 is sized and shaped such that the outer edge 156 thereof shares its circumference with that of the circular hole H. As such, when the insertion member 22 is positioned adjacent the panel P1, the outer edge 156 engages the sidewalls S of the circular hole H. The rib 154 and the radial ribs 148 and 149 serve to stabilize the position of the insertion member 22 within the circular hole H, and the rib 154 serves in supporting the insertion member 22 relative to the panel P1.

To provide an attachment point for the mounting plate 21, the circular hole H is initially formed in the panel P1. The circular hole H is sized according to the guide sleeve 24, as well as the rib 154 and the radial ribs 148 and 149. Thereafter, the guide sleeve 24 is inserted (12) into the circular hole H provided in the panel P1. To maintain the position of the guide sleeve 24 in the circular hole H, the upper and lower rims 108 and 109, and the exterior surfaces of the arms 102 and 104 are interfaced with the sidewalls S. Thereafter, as depicted in 13, the tab member 26 is removably coupled to the insertion member 22, and the leading end 32 of the insertion member 22 is inserted into the insertion aperture 106. During further insertion of the insertion member 22 through the insertion aperture 106 into the confines of the wall W, the hubs 72 and 74 are provided through the aperture ears 112 and 114 into the channels 116 and 118, respectively. As such, the rails 90 and 92 are received between the end caps 82 and the hub bases 76 and 78, and the posts 80 engage the rails 90 and 92, respectively.

Via actuation of the tab member 26, movement and articulation of the insertion member 22 relative to the guide sleeve 24 within the confines of the wall W can be controlled. For example, when the insertion member 22 is in a horizontal insertion orientation, the rib 140 of the tab member 26 engages the hook member 142 at the notch 146. As such, the tab member 26 can be used to push the insertion member 22 along the channels 116 and 118. In doing so, the posts 80 of the hubs 72 and 74 slide along the rails 90 and 92, respectively. Eventually, movement of the posts 80 along the rails 90 and 92 transitions the hubs 72 and 74 from positions along the horizontal sections 120 to positions along the non-horizontal sections 121.

Transitioning the hubs 72 and 74 into the non-horizontal sections 121 aids in reorienting the insertion member 22 from a horizontal insertion orientation to a vertical installed orientation. The non-horizontal sections 121 can be curved or angled, and these shapes aid in facilitating the reorientation of the insertion member 22. For example, the shape of the non-horizontal sections 121 angles the leading end 32 upwardly as insertion member 22 is pushed further along the channels 116 and 118. Furthermore, the tab member 26 can be configured to bend during articulation of the insertion member 22 by the user. The bending of the tab member 26 can further angle the leading end 32 of the insertion member 22 upwardly. Moreover, by reducing possible interference between the insertion member 22 and the panels P1 and P2, the rounded leading end 32 and the trailing end 33, as well as the wedge shapes formed by the ribs 54, 55, 56, and 57 adjacent the leading end 32 and the trailing end 33 permit the insertion member 22 to be reoriented within the confines of the wall W from a horizontal insertion orientation to a vertical installed orientation.

Once the leading end 32 is angled upwardly, the tab member 26, as depicted in 14, can be used to pull the insertion member 22 toward the panel P1. Pulling the insertion member 22 into contact with the panel P1 completes the reorientation of the insertion member 22 from a horizontal insertion orientation to a vertical installed orientation. As the insertion member 22 is being parallelly aligned with the panel P1 (15), the ratchet mechanism R formed by the pawls 84 of the hubs 72 and 74 and the indentations 94 and 96 serves to the maintain the position of the insertion member 22. For example, as the insertion member 22 is being parallelly aligned, the pawls 84 interact with the indentations 94 and 96, and the interaction therebetween serves to prevent the insertion member 22 from backing away from its position adjacent the panel P1. Furthermore, when received within the circular hole H, the rib 154 and the radial ribs 148 and 149 serve to stabilize the position of the insertion member 22 within the circular hole H, and the rib 154 serves in supporting the insertion member 22 relative to the panel P1.

When the insertion member 22 is parallelly aligned with the panel P1, the aperture 44 is positioned, as depicted in 16, adjacent the circular hole H. As such, the threaded fastener 46 can be inserted through the mounting plate 21, and received in the aperture 44. Engagement of the threaded fastener 46 with the threads 45 of the aperture 44 serves to attach the mounting plate 21 to the wall W by clamping the panel P1 between the mounting plate 21 and the insertion member 22.

Because the rim 40 and the collar 42, and, hence, the aperture 44 are placed farther from the leading edge 32 than from the trailing edge 33, the loading bearing capacity of the mounting mechanism 20 is relatively large. That is, having a greater portion of the insertion member 22 above (rather than below) the circular hole H affords a relatively large load bearing capacity. As such, the insertion member 22 can more effectively articulate within the confines of the wall W between the panels P1 and P2 (i.e., approximately 3.5 inches, the width of conventional 2.times.4 studs), while, simultaneously, affording a relatively large load bearing capacity. For example, it has been found that an insertion member 22 having a length of approximately 2.57 inches from the center of the aperture 44 to the leading edge 32 and a length of approximately 1.18 inches from the center of the aperture 44 to the trailing edge 33 provides the desired functionality. As such, the insertion member 22 can be configured with the above-discussed lengths to both allow more effective articulation within the confines of the wall W and afford a relatively large load bearing capacity.

While in accordance with the Patent Statutes, only the best mode and exemplary embodiments have been presented and described in detail, it is to be understood that the invention is not limited thereto or thereby.

The invention claimed is:

1. A mounting assembly, comprising:
a base member operable to be inserted into a base opening in a wall, the base member including a flange and an arm depending from the flange, the flange including an insertion opening, the arm including a guide, the guide including a portion that is generally perpendicular to the flange and a portion that is generally non-perpendicular to the flange; and
an insertion member operable to be inserted through the insertion opening in the base member, the insertion member including a generally planar surface, the insertion member further including a hub operable to interact with the guide on the arm of the base member;
wherein the insertion member is moved from an insertion orientation in which the generally planar surface of the insertion member is generally perpendicular to the flange and the hub interacts with the portion of the guide that is generally perpendicular to the flange, to an intermediate orientation in which the generally planar surface of the insertion member is generally non-perpendicular to the flange and the hub interacts with the portion of the guide that is generally non-perpendicular to the flange, to an installed orientation in which the generally planar surface of the insertion member is generally parallel to the flange and the hub interacts with the portion of the guide that is generally perpendicular to the flange.

2. The mounting assembly of claim 1, wherein the generally non-perpendicular portion of the guide is curved.

3. The mounting assembly of claim 1, wherein the insertion member includes a fastener opening operable to receive a fastener.

4. The mounting assembly of claim 1, wherein the guide on the base member and the hub on the insertion member form a ratchet mechanism operable to maintain the insertion member in the installed orientation.

5. The mounting assembly of claim 1, further including a tab member operable to move the insertion member from the insertion orientation to the intermediate orientation to the installed orientation.

6. The mounting assembly of claim 5, wherein the tab member is removably coupled to the insertion member.

7. A mounting assembly, comprising:
a base member operable to be inserted into a base opening in a wall, the base member including a flange and an arm depending from the flange, the flange including an insertion opening, the arm including a guide; and
an insertion member operable to be inserted through the insertion opening in the base member, the insertion member including a leading end, a trailing end, and a base plate, the base plate including a first side and a second side, the insertion member further including a reinforcing member provided on the second side, the reinforcing member forming a wedge shape adjacent the trailing end, the insertion member further including a hub operable to interact with the guide on the arm of the base member;
wherein the insertion member is moved from an insertion orientation in which the base plate of the insertion member is generally perpendicular to the flange, to an intermediate orientation in which the base plate of the insertion member is generally non-perpendicular to the flange, to an installed orientation in which the base plate of the insertion member is generally parallel to the flange.

8. The mounting assembly of claim 7, wherein the reinforcing member forms a wedge shape adjacent the leading end.

9. The mounting assembly of claim 7, wherein the insertion member is integrally formed.

10. The mounting assembly of claim 7, wherein the insertion member includes a fastener opening operable to receive a fastener.

11. The mounting assembly of claim 7, wherein the guide on the base member and the hub on the insertion member form a ratchet mechanism operable to maintain the insertion member in the installed orientation.

12. The mounting assembly of claim 7, further including a tab member operable to move the insertion member from the insertion orientation to the intermediate orientation to the installed orientation.

13. The mounting assembly of claim 12, wherein the tab member is removably coupled to the insertion member.

14. A mounting assembly, comprising:
a base member operable to be inserted into a base opening in a wall, the base member including a flange and an arm depending from the flange, the flange including an insertion opening, the arm including a guide; and
an insertion member operable to be inserted through the insertion opening in the base member, the insertion member including a leading end, a trailing end, and a base plate, the base plate including a first side and a second side, the insertion member further including a reinforcing member provided on the second side, a height of the reinforcing member decreasing as the reinforcing member extends toward the trailing end, the insertion member further including a hub operable to interact with the guide on the arm of the base member;
wherein the insertion member is moved from an insertion orientation in which the base plate of the insertion member is generally perpendicular to the flange, to an intermediate orientation in which the base plate of the insertion member is generally non-perpendicular to the flange, to an installed orientation in which the base plate of the insertion member is generally parallel to the flange.

15. The mounting assembly of claim 14, wherein the height of the reinforcing member decreases as the reinforcing member extends toward the leading end.

16. The mounting assembly of claim 14, wherein the insertion member includes a fastener opening operable to receive a fastener.

17. The mounting assembly of claim 14, wherein the guide on the base member and the hub on the insertion member form a ratchet mechanism operable to maintain the insertion member in the installed orientation.

18. The mounting assembly of claim 14, further including a tab member operable to move the insertion member from the insertion orientation to the intermediate orientation to the installed orientation.

19. The mounting assembly of claim 18, wherein the tab member is removably coupled to the insertion member.

20. A mounting assembly, comprising:
   a base member operable to be inserted into a base opening in a wall, the base member including a flange and an arm depending from the flange, the flange including an insertion opening, the arm including a guide; and
   an insertion member operable to be inserted through the insertion opening in the base member, the insertion member including a leading end, a trailing end, and a base plate, the insertion member further including a hub operable to interact with the guide on the arm of the base member;
   wherein the insertion member is moved from an insertion orientation in which the base plate of the insertion member is generally perpendicular to the flange, to an intermediate orientation in which the base plate of the insertion member is generally non-perpendicular to the flange, to an installed orientation in which the base plate of the insertion member is generally parallel to the flange; and
   wherein, when the insertion member is in the installed orientation, the leading end of the insertion member is above the insertion opening, the trailing end of the insertion member is below the insertion opening, and a length of the insertion member above the insertion opening is greater than a length of the insertion member below the insertion opening.

21. The mounting assembly of claim 20, wherein the length of the insertion member above the insertion opening is more than twice the length of the insertion member below the insertion opening.

22. The mounting assembly of claim 20, wherein the insertion member includes a fastener opening operable to receive a fastener.

23. The mounting assembly of claim 20, wherein the guide on the base member and the hub on the insertion member form a ratchet mechanism operable to maintain the insertion member in the installed orientation.

24. The mounting assembly of claim 20, further including a tab member operable to move the insertion member from the insertion orientation to the intermediate orientation to the installed orientation.

25. The mounting assembly of claim 24, wherein the tab member is removably coupled to the insertion member.

* * * * *